United States Patent [19]

Lin

[11] Patent Number: 5,468,460
[45] Date of Patent: Nov. 21, 1995

[54] STABILIZATION OF CALCIUM-BASED SLURRIES FOR SOX REDUCTION BY IN-FURNACE INJECTION

[75] Inventor: M. Linda Lin, Naperville, Ill.

[73] Assignee: Nalco Fuel Tech, Naperville, Ill.

[21] Appl. No.: 179,447

[22] Filed: Jan. 10, 1994

[51] Int. Cl.⁶ .............................. C01F 11/00; B01D 53/50
[52] U.S. Cl. ................. 423/266; 423/267; 423/268; 423/242.1; 423/243.01; 423/243.08; 252/182.32
[58] Field of Search .................. 423/242.1, 243.01, 423/243.08, 265, 267, 268, 266; 252/182.32, 183.16, 182.29

[56] References Cited

U.S. PATENT DOCUMENTS

| | | | |
|---|---|---|---|
| 4,026,991 | 5/1977 | Chamberlain | 423/177 |
| 4,555,996 | 12/1985 | Torbov et al. | 110/345 |
| 4,741,890 | 5/1988 | Rose et al. | 423/242 |
| 4,869,885 | 9/1989 | Lin et al. | 423/242 |
| 4,997,631 | 3/1991 | Hofmann et al. | 423/235 |
| 5,017,347 | 5/1991 | Epperly et al. | 423/235 |
| 5,057,293 | 10/1991 | Epperly et al. | 423/235 |
| 5,058,514 | 10/1991 | Mozes et al. | 110/345 |

FOREIGN PATENT DOCUMENTS

| | | |
|---|---|---|
| 0373351 | 11/1989 | European Pat. Off. . |
| 63-224715 | 9/1988 | Japan ............ 423/242 |

Primary Examiner—Wayne Langel
Assistant Examiner—Timothy C. Vanoy
Attorney, Agent, or Firm—St. Onge Steward Johnston & Reens

[57] ABSTRACT

More reliable removal of sulfur oxides ($SO_x$) from combustion effluents by in furnace injection is achieved by stabilizing slurries of calcium carbonate (limestone), calcium oxide (lime) and calcium hydroxide (hydrated lime) for extended periods of time and during in-furnace injection. The slurries are stabilized by a stabilization system comprising a generally hydrophobic surfactant having an HLB of less than about 8 and a more hydrophilic surfactant having an HLB of at least about 8, wherein the HLB values of the hydrophobic and the hydrophilic surfactants differ by at least about 3.

10 Claims, 3 Drawing Sheets

5,468,460

STABILIZATION OF CALCIUM-BASED SLURRIES FOR SOX REDUCTION BY IN-FURNACE INJECTION

TECHNICAL FIELD

The invention relates to improvements enabling the storage of slurries of calcium carbonate (limestone), calcium oxide (lime) and calcium hydroxide (hydrated lime) for extended periods of time to assure consistent removal of sulfur oxides ($SO_x$) from combustion effluents by in-furnace injection.

The combustion of carbonaceous materials containing sulfur, including fossil fuels and waste, is being closely regulated by governments around the world. Combustion of these materials oxidizes the sulfur to produce a variety of oxides of sulfur—referred to as a group as $SO_x$. Regulations are in place in many countries to reduce the amounts of sulfur oxides released to the atmosphere to alleviate the problems associated with acid rain.

Numerous strategies are being employed to reduce the discharge of $SO_x$ to the atmosphere. Among these are methods for cleaning sulfur from fuels prior to combustion, methods for chemically tying up the sulfur during the combustion process, and methods for removing the sulfur oxides from combustion effluents. Among the methods for treating combustion effluents to remove $SO_x$ are wet scrubbing, dry scrubbing, and in-furnace injection.

The technology of in-furnace injection, introduces calcium-based sorbents directly into furnaces to contact high-temperature combustion gases to remove $SO_x$. This is an essential technology because it is practical for retrofitting older units—an economic alternative to putting them out of service. However, unless the process can be operated reliably, reduction goals will not be met. Unlike wet and dry scrubbing which employ relatively low temperatures (e.g., typically less than 400° F.), in-furnace injection requires slurries to be fed through conduits and spray nozzles at extreme temperatures (e.g., generally above 400° F. and typically as high as 1600° to 2600° F.).

Unlike the nozzles used for wet scrubbing, those for in-furnace injection are often high-pressure nozzles with narrow orifices. The supply lines are typically narrow and are subjected to temperatures sufficient to dry the slurry if flow were slowed or stopped. The high temperatures associated with in-furnace injection make it extremely difficult to maintain smooth flow through the conduits and nozzles without plugging or clogging. Problems have been experienced in the operation of in-furnace injection with too great a frequency.

It would be desirable to improve the reliability and control of in-furnace injection technology for treating $SO_x$-laden combustion effluents, by providing slurries and methods for preparing and maintaining them that have greater stability, have less tendency for primary particles to agglomerate, and are less susceptible to clogging supply lines and plugging nozzles.

BACKGROUND ART

The technology for injecting calcium-based sorbents directly into furnaces to contact high-temperature combustion gases to remove $SO_x$ has employed the use of a variety of reagents. The most preferred are those which are effective even after being stored and transported for extended periods and can be stored and transported with minimal special handling. Calcium carbonate (commercially available in a number of forms including limestone), calcium oxide, and calcium hydroxide are the materials of choice. However, they tend to plug supply lines, clog spray nozzles, and separate (water from the suspended solids) upon standing.

In U.S. Pat. No. 4,555,996, Torbov discloses that injection of slurries of calcium compounds into furnaces at temperatures above about 2200° F., is superior to the use of the same compounds in dry form. However, Torbov does not identify the problems associated with slurry stability.

In European published patent application No. 373,351, DeMichele and Quattroni discuss the use of a mixture of urea, hydrate lime and water in conjunction with an electrostatic precipitator to reduce nitric oxide and sulfur anhydrides. It is indicated that, when the lime concentration is greater than or equal to 35% of the dispersion, a polysaccharide and ligninsulfonate dispersing agent is employed. However, the dispersing agents are not as effective as desired, and DeMichele and Quattroni do not even recognize the need for one at concentrations of less than 35%. And, while in U.S. Pat. No. 4,869,885, Lin and Mouche' disclose the use of dispersants for wet and dry scrubbers to improve scrubbing efficiency, the reasons addressed there are not the ones of principal concern for in-furnace injection. Again, in-furnace injection uses smaller conduits and nozzles, and injects smaller slurry volumes—typically horizontally—across greater distances into much higher temperature zones. The Lin and Mouche' patent simply does not address the problems of slurry stability under the extreme conditions posed by in-furnace injection.

In U.S. Pat. No. 5,058,514, Mozes, Mangal, and Thampi disclose a slurry injection process for $SO_2$ and $NO_x$ reduction using calcium carbonate and a nitrogenous progenitor such as urea. No interaction was found. The disclosed advantage is the independent activity of the components—i.e., no loss of activity as compared with independent use of the components. Also, other than noting that maintenance of slurry stability can be achieved by constant recirculation and mixing, the stability of the slurry in lines and nozzles is not addressed.

The prior art does not address the points necessary to achieve improvements in the reliable handling of calcium-based sorbent slurries for in-furnace injection for $SO_x$ reduction.

DISCLOSURE OF THE INVENTION

It is an object of the invention to provide improved methods and compositions for improving the reliability in handling and utilizing calcium-based sorbent slurries for in-furnace injection for $SO_x$ reduction.

It is an object of a preferred embodiment of the invention to provide improved methods for handling calcium-based slurries to improve the reliability of $SO_x$ removal by in-furnace injection.

It is yet another and more specific object of the invention to provide improved calcium-based slurries for removing $SO_x$ from hot combustion gases by in-furnace injection of those slurries.

It is another object of the invention to provide methods and compositions for improving the reliability in handling and utilizing calcium/magnesium-based sorbent slurries for in-furnace injection at highly elevated temperatures to reduce the amounts of $SO_x$ discharged with the effluent and without requiring a separate scrubbing chamber.

It is a further object of the invention to enable improved handling of calcium-based slurries, including those with significant magnesium contents, to improve the reliability of $SO_x$ removal by in-furnace injection of those slurries.

These and other objects are accomplished by the invention which provides both improved methods and compositions.

In one aspect, the composition of the invention comprises: an aqueous slurry comprising a calcium-containing material which is capable of reacting with sulfur oxides at temperatures above 400° F. to form calcium sulfites and sulfates, and a stabilizer system comprising a generally hydrophobic surfactant having an HLB of less than about 8 and a more hydrophilic surfactant having an HLB of at least about 8, wherein the HLB values of the hydrophobic and the hydrophilic surfactants differ by at least about 3, preferably at least about 5.

In one aspect, the method of the invention comprises: preparing an aqueous slurry as defined above; and, injecting the slurry into the combustion gases in a furnace at a location where the temperature is at least about 400° F.

Preferably, the ratio of the weight of the hydrophobic dispersant to the weight of the hydrophilic dispersant is within the range of from about 25:1 to about 1:1, e.g. from about 12:1 to about 2:1. The dispersant system is typically employed in the slurry at a concentration of from about 1 to about 20,000 parts per million w/v (ppm), and preferably from about 250 to about 1,000 ppm.

Slurries will typically contain from about 5 to about 50%, and preferably from about 10 to about 30%, active calcium-containing material based on the weight of the slurry.

BRIEF DESCRIPTION OF THE DRAWINGS

The invention will be better understood and its advantages will be better appreciated from the following detailed description, especially when read in light of the accompanying drawings, wherein.

INDUSTRIAL APPLICABILITY

The improvements of the invention have preferred application to coal-fired utility boiler combustion gases, and in some aspects are particularly effective for high chloride operations such as incinerators. While the advantages may be the greatest in these types of operations, the invention is by no means limited to them. Combustion gases from the combustion of all types of carbonaceous materials can be treated, also including natural gas, synthetic gas, fuel oils, bitumens and residual fuel oils, domestic and industrial solid or other combustible waste, and the like.

Figure 1:
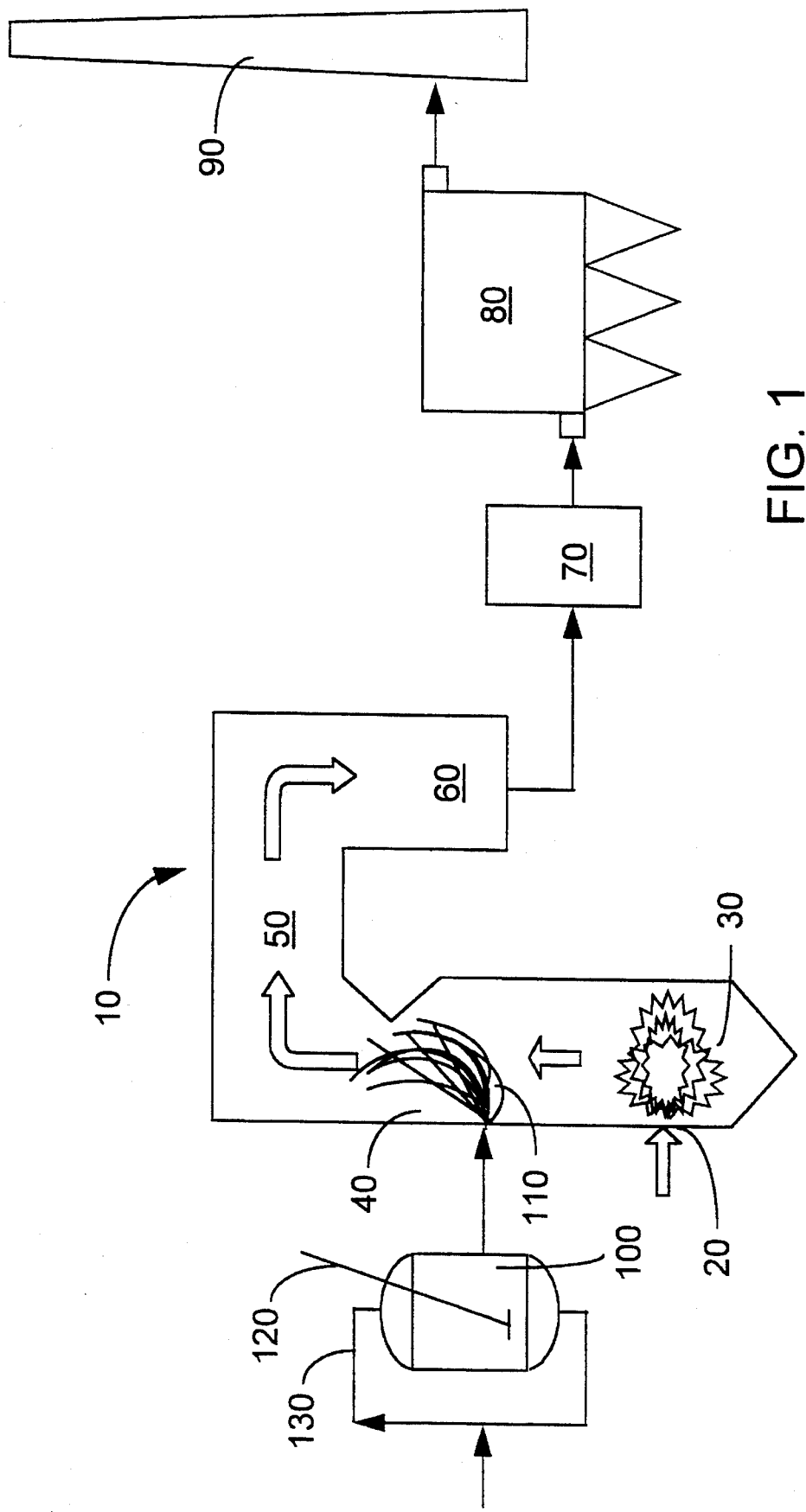
FIG. 1 is a schematic view of a preferred embodiment of the process of the invention employing a slurry stabilized according to the invention for reducing $SO_x$ by injecting the slurry into the combustion gases within a large boiler.

The following description is centered on the preferred embodiment of FIG. 1 which is a schematic flow diagram of one representative process scheme according to the invention. FIG. 1 shows a large combustor 10 of the type used in utilities, for incinerating waste, and for industrial steam generation. Fuel from feed 20 is fed in flame zone 30. Hot combustion gases (represented by the open arrows) flow from the flame zone 30 through the near post-combustion section 40 and subsequent sections 50 and 60, prior to entering air heater 70. FIG. 1 shows slurry from tank 100 being injected into the combustion gases by an injector 110 into section 40. If desired, the slurry can be introduced at any of the sections identified. The combustion gases, after exiting the air heater 70, are passed through particulate-separating device 80 which can be an electrostatic precipitator or a bag house. Once cleaned of particulates, the cleaned combustion gases can be discharged through stack 90.

In-furnace injection will be accomplished by injecting a calcium-based slurry for $SO_x$ reduction into the combustion gases within the furnace where the temperature generally exceeds 400° F. Temperatures of from about 800° to about 2400° F. are typical, with the range of from about 800° to about 1400° F. in some cases, from about 1400° to about 1900° F. in others, and from about 1900° to about 2400° F. in yet others. The principal considerations in selecting the temperature for injection are the geometry of the furnace and the ability to inject into a zone which will permit good mixing and distribution of the slurry within the combustion gases. The higher the temperature, the more extreme the problems which must be solved by the invention.

The slurries are typically injected from atomization nozzles which employ an atomization fluid, such as air or steam, to force the slurry through small-diameter orifices in a spray of small droplets. These nozzles typically have feed lines of less than about 25 mm, e.g. from about 8 to about 15 mm, in diameter and feed the slurry at a rate of from about 1 to about 10, typically less than about 5, gallons per minute (gpm) from each nozzle. Pressures of less than about 100 pounds per square inch (psig), e.g. from about 40 to about 60 psig for the slurry and about 40 to about 80 psig for air, are typical. Nozzles of this type have a tendency to plug under the high temperatures involved during in-furnace injection.

To form the slurry, water, a suitable calcium-containing material, and a dispersant system of the invention are introduced into a suitable vessel 100. The vessel is preferably stirred by a suitable means 120 and with recirculation through line 130 by a pump not shown. The vessel will preferably be of a size sufficient to hold from about 8 to about 24 hours supply. The pump should have sufficient capacity to cause complete recirculation of the contents of the vessel from every 8 to about 24 hours.

Limestone is the preferred form of calcium carbonate but can be replaced with another form, if desired. In addition to limestone, other forms of calcium carbonate include oyster shells, aragonite, calcite, chalk, marble, marl, and travertine. It can be mined or manufactured. In this description, the terms calcium carbonate and limestone are used interchangeably. In addition to calcium carbonate, other active $SO_x$-reducing calcium compounds such as calcium oxide, and calcium hydroxide can be employed. These materials can be relatively pure or can contain commercially-acceptable amounts of other materials. Specifically, the calcium compounds can be supplied from minerals such as dolomite and magnesite which have significant magnesium contents.

In one aspect, the aqueous slurry will comprise a suitable calcium-containing material which is capable of reacting with sulfur oxides at temperatures above 400° F. to form calcium sulfites and sulfates, and a stabilizer system comprising a generally hydrophobic surfactant having an HLB of less than about 8 and a more hydrophilic surfactant having an HLB of at least about 8, wherein the HLB values of the hydrophobic and the hydrophilic surfactants differ by at least about 3. Preferably, the difference in HLB values for the two different dispersants is at least about 5. The ratio of the weight of the hydrophobic dispersant to the weight of the hydrophilic dispersant is preferably within the range of from about 25:1 to about 1:1, e.g. from about 12:1 to about 2:1. The dispersant system is typically employed at a concentration of from about 1 to about 20,000 parts per million w/v (ppm), and preferably from about 250 to about 1,000 ppm.

Preferred hydrophobic dispersants (HLB values of less than 8) are materials selected from the group consisting of ethoxylated phenol ethanol, block polymers of ethylene oxide and propylene oxide, petroleum sulfonates, organo phosphate esters, fatty acids such as oleic acid, castor oil, alkyl sulfonates, fatty acid alkanolamides, and mixtures of any two or more of these. Preferred hydrophilic dispersants are materials selected from the group consisting of alkanolamides, lauryl sulfate salts, dodecyl benzene sulfonates, amide sulfonates, phosphate esters, and mixtures of any two or more of these.

Slurries will typically contain from about 5 to about 50%, and preferably from about 10 to about 30%, active calcium-containing material based on the weight of the slurry. The amount of calcium-containing material can be varied depending upon the amount of $SO_2$ in the effluent and the amount of the nitrogenous treatment agent in the composition. Preferably, the calcium-containing material will be included in the composition at a molar ratio of calcium to baseline $SO_2$ (i.e., pre-treatment level) of about 1:2 to about 4:1, more preferably about 1:1 to about 3:1.

The individual particles of calcium-containing material in the slurry will typically be within the size range of from about 0.05 to about 50 μm (i.e., microns or micrometers, weight average diameter), with the exact size depending on the commercial form of the material. Calcium hydroxide will preferably have an average primary particle size of from about 0.05 to about 5.0 μm, with fewer than 2% agglomerates having diameters greater than about 1 μm. Calcium oxide will preferably have an average primary particle size of from about 0.5 to about 25 μm, with fewer than 5% agglomerates having diameters greater than about 10 μm. And, calcium carbonate will preferably have an average primary particle size of from about 1 to about 50 μm, with fewer than 10% agglomerates having diameters greater than about 20 μm.

Nitrogenous treatment agents can also be present in the slurry and injection accomplished under conditions effective to achieve $NO_x$ reduction (typically temperatures of from about 1600° to about 2000° F.). Among the suitable nitrogenous treatment agents are those disclosed, for instance, in U.S. Pat. Nos. 4,997,631, 5,017,347, and 5,057,293, the disclosures of each of which are incorporated herein by reference. Such nitrogenous agents include urea; hydrolysis products of urea, including ammonium carbamate in a complex with a single unique structure of ammonium carbonate/ammonium bicarbonate at a ratio of ammonium carbamate to ammonium carbonate/ammonium bicarbonate of about 10:1 to about 1:9; ammonia; hexamethylenetetramine (HMTA); ammonium carbamate; ammonium carbonate; and ammonium bicarbonate. Various equivalent ammonium salts are included. Preferred for use as the $NO_x$-reducing component of the invention composition are urea and the hydrolysis products of urea.

The nitrogenous treatment agent is preferably present in a ratio of the nitrogen in the treatment agent to the baseline (i.e., pre-treatment) effluent nitrogen oxides level which can vary between about 0.5 and about 3.5. This ratio can be referred to as the "normalized stoichiometric ratio" or "NSR". "Normalized stoichiometric ratio" refers to the ratio of the concentration of reducing-radicals, such as $NH_x$ radicals, to the concentration of nitrogen oxides in the effluent and can be expressed as $[NH_x]/[NO_x]$. ($NH_x$ radicals, with x being an integer, are believed to be the moiety contributed by the treatment agent which facilitates the series of reactions resulting in $NO_x$ reduction to $N_2$.) Alternatively, the molar ratio of the treatment agent to the $NO_x$ concentration can be used in place of NSR when the chemistry of reduction is not well defined; the term NSR as used herein will also be understood to encompass molar ratio when appropriate.

Advantageously, the nitrogenous treatment agent is included in an amount of about 3% to about 35% by weight of the total composition, excluding diluent (i.e., water) and about 1% to about 15% of the final slurry. When the urea is added in an aqueous solution, the solution water should not be taken into account in calculating the weight of urea being added.

Generally, the weight ratio of sorbent to nitrogenous agent can be within the range of from about 1.5:1 to about 33:1, more preferably from about 2.7:1 to about 22:1. Besides the nitrogenous agent and the calcium-based sorbent, the remainder of the composition comprises water or other diluent sufficient to form a slurry. Generally, the slurry comprises from about 20% to about 70% solids by weight, preferably from about 25% to about 50% solids by weight.

EXAMPLES

The following examples are presented for the purpose of further illustrating and explaining the invention, and are not to be taken as limiting in any regard. Unless otherwise indicated, all parts and percentages are based on the weight of the components at the stage of processing indicated.

Example 1

Figure 2A:
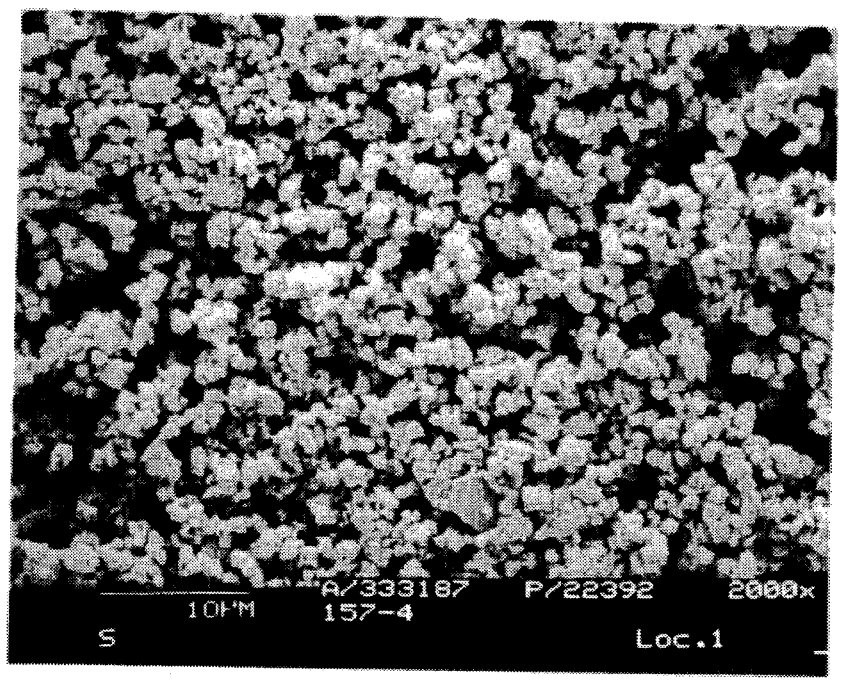
FIGS. 2A and 2B are photographs taken by scanning electron microscopy, showing the greater uniformity of particle sizes achieved according to the invention as illustrated in Example 1.
Figure 2B:
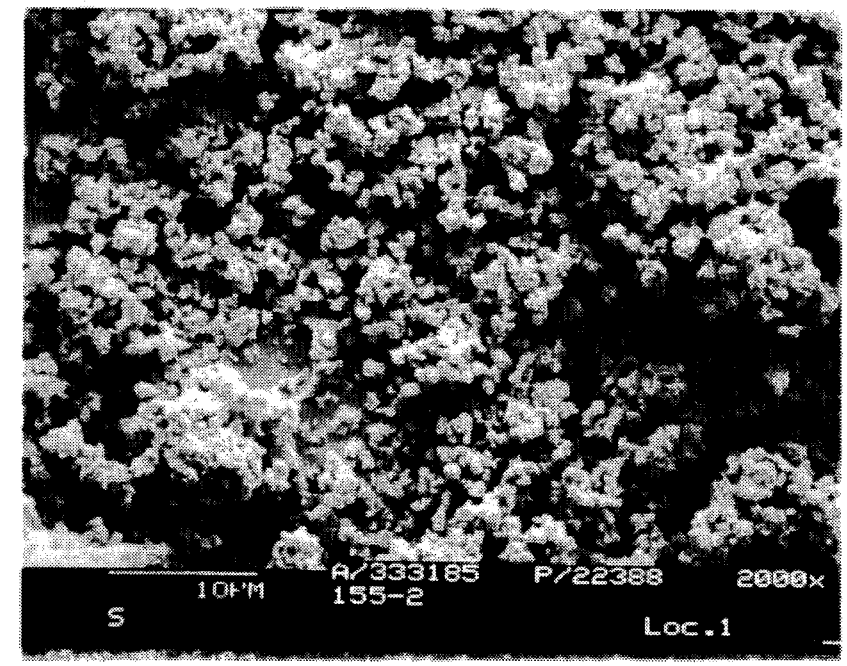

A calcium-based slurry was prepared using 20% High-Calcium hydrated lime (from Millard Lime & Stone Company, Annville, Pa.) in water. The slurry contained a stabilizing surfactant system (SSS) comprising 91% ethoxylated phenol ethanol (Triton X-15, HLB= 3.5) and 9% alkanolamide (Witcamide 5138, HLB= 9.8). The stability of the slurry was determined by measuring the volume of water that split from the solids as a function of time. The dispersion of the slurry was determined by scanning electron microscopy. And, the particle sizes of the slurry particles was determined by an HORIBA particle size analyzer. The results are shown in the following table:

| I. Stability | | |
| --- | --- | --- |
| 0% SSS | one month | 14–18% water split |
| 1% SSS | one month | less than 5% water split |
| 0% SSS | three months | 20% water split |
| 1% SSS | three months | less than 5% water split |
| II. Dispersion | | |
| 1.1% SSS | more uniform and less aggregates (compare FIG. 2A of a slurry which included the SSS to FIG. 2B of a slurry which did not) | |

| III. Particle Size | |
|---|---|
| Blank | 39% below 0.1 microns |
| | D(median) 0.15 microns |
| 1% SSS | 71% below 0.1 microns |
| | D(median) 0.07 microns |

Example 2

Figure 3:
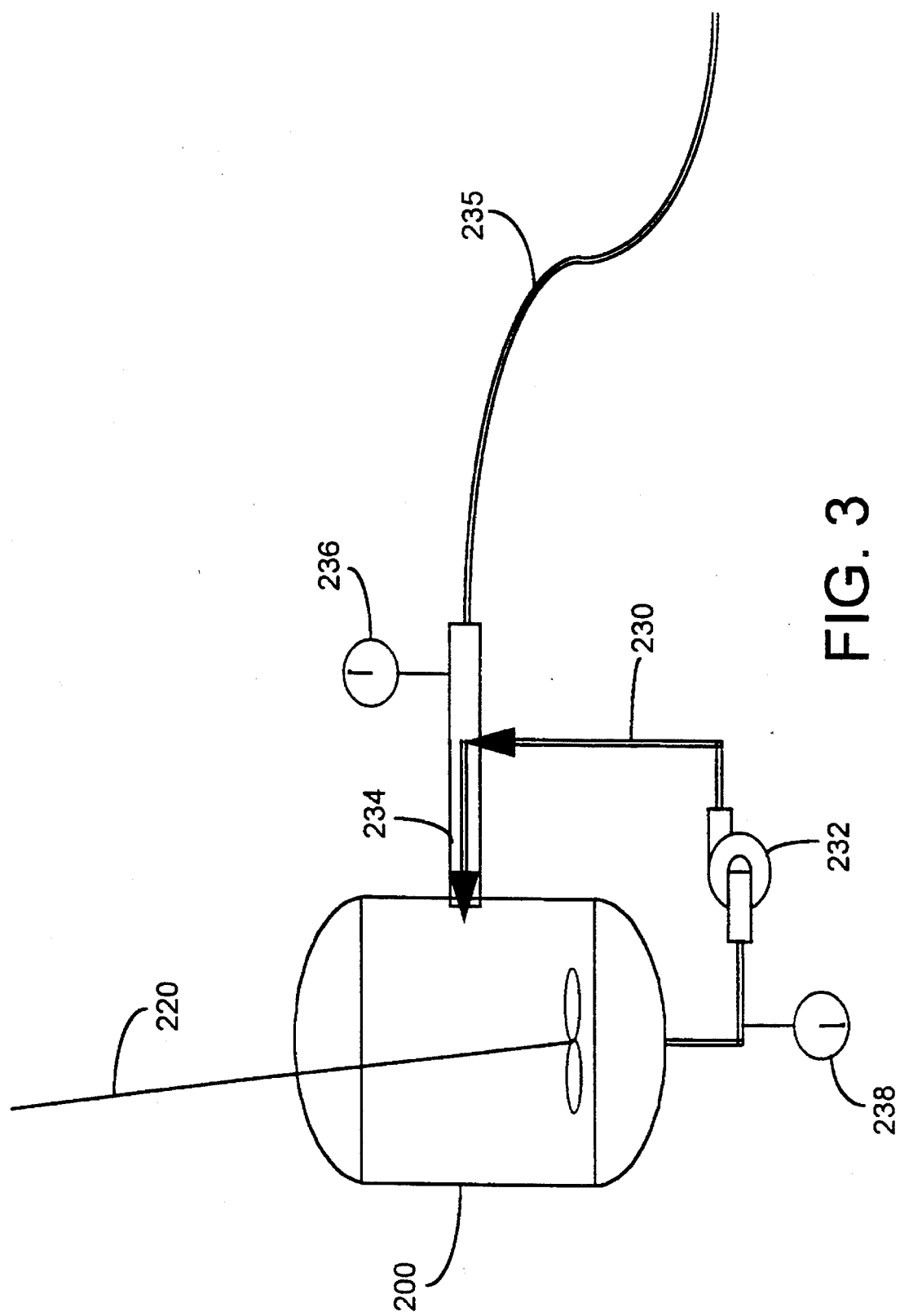
FIG. 3 is a schematic diagram of the laboratory apparatus employed in the conduct of Example 2 which shows a great improvement in spray run time achieved according to the invention.

A lime slurry (the same composition as in Example 1) was made up in a five gallon container 200 (see FIG. 3) which was constantly agitated by means of stirrer 220. The slurry was continuously recycled through line 230 by means of a pump 232 and injector assembly 234 at 1 gpm using a pressure of the atomizing air (supplied via line 235) of 40 psig as indicated by gage 236. The pressure increase in the suction side of the pump was monitored by gage 238 as spray run time was increased. A failure time was recorded as the time at which the pump could not push any more slurry through the injector, as indicated by a high pump suction side pressure. The test was run with a without the slurry stabilization system of Example 1 additive (91% Triton X-15 and 9% Witcamide 5138) added to the 20% $Ca(OH)_2$ slurry at 500 ppm. The results are summarized in the table below:

| TEST | RESULTS |
|---|---|
| No SSS | Failure in 51 hours |
| with 500 ppm SSS | No failure after 168 hours |

The above description is for the purpose of teaching the person of ordinary skill in the art how to practice the invention, and it is not intended to detail all of those obvious modifications and variations of it which will become apparent to the skilled worker upon reading the description. It is intended, however, that all such obvious modifications and variations be included within the scope of the invention which is defined by the following claims. The claims are meant to cover the claimed elements and steps in any arrangement or sequence which is effective to meet the objectives there intended, unless the context specifically indicates the contrary.

I claim:

1. A method for stabilizing a slurry of a calcium-based sorbent for reducing $SO_x$ by in-furnace injection of the sorbent into hot combustion gases produced by the combustion of a sulfur-containing carbonaceous fuel, comprising:

(a) preparing an aqueous slurry comprising
   a calcium-containing material which is capable of reacting with sulfur oxides at temperatures above 400° F. to form calcium sulfites and sulfates, and a stabilizer system comprising a generally hydro phobic surfactant having an HLB of less than about 8 and a more hydrophilic surfactant having an HLB of at least about 8, wherein the HLB values of the hydrophobic and the hydrophilic surfactants differ by at least about 3; and, (b) injecting the slurry into the combustion gases in a furnace at a location where the temperature is at least about 400° F.

2. A method according to claim 1 wherein, the difference in HLB values for the two different dispersants is at least about 5.

3. A method according to claim 1 wherein, the ratio of the weight of the hydrophobic dispersant to the weight of the hydrophilic dispersant is within the range of from about 25:1 to about 1:1.

4. A method according to claim 3 wherein, the ratio of the weight of the hydrophobic dispersant to the weight of the hydrophilic dispersant is within the range of from about 12:1 to about 2:1.

5. A method according to claim 1 wherein, the dispersant system is employed at a concentration of from about 1 to about 20,000 parts per million w/v.

6. A method according to claim 5 wherein, the dispersant system is employed at a concentration of from about 250 to about 1,000 ppm.

7. A method according to claim 1 wherein the slurry contains from about 5 to about 50% active calcium-containing material based on the weight of the slurry.

8. A method according to claim 1 wherein the individual particles of calcium-containing material in the slurry are within the size range of from about 0.05 to about 50 μm.

9. A method according to claim 1 wherein the calcium containing material comprises calcium hydroxide having an average primary particle size of from about 0.05 to about 5.0 μm, with fewer than 2% agglomerates having diameters greater than about 1 μm.

10. A method according to claim 1 wherein the calcium containing material comprises calcium oxide having an average primary particle size of from about 0.5 to about 25 μm, with fewer than 5% agglomerates having diameters greater than about 10 μm.

* * * * *